US008315283B2

(12) United States Patent
Hoffman

(10) Patent No.: US 8,315,283 B2
(45) Date of Patent: Nov. 20, 2012

(54) WAVELENGTH SELECTABLE LASER SYSTEMS AND RELATED METHODS

(75) Inventor: Robert C. Hoffman, Woodstock, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 277 days.

(21) Appl. No.: 12/178,251

(22) Filed: Jul. 23, 2008

(65) Prior Publication Data

US 2010/0020832 A1      Jan. 28, 2010

(51) Int. Cl.
    *H01S 3/10* (2006.01)
(52) U.S. Cl. .................................. 372/22; 372/5; 372/75
(58) Field of Classification Search .............. 372/22, 372/5, 75
    See application file for complete search history.

(56) References Cited

U.S. PATENT DOCUMENTS

| | | | |
|---|---|---|---|
| 4,464,761 A * | 8/1984 | Alfano et al. ................ | 372/41 |
| 4,599,727 A | 7/1986 | Jenssen | |
| 4,656,635 A * | 4/1987 | Baer et al. ................ | 372/27 |
| 4,982,405 A | 1/1991 | Zayhowski et al. | |
| 5,805,626 A * | 9/1998 | Komatsu et al. ............ | 372/41 |
| 5,923,685 A | 7/1999 | Akagawa et al. | |
| 5,936,981 A | 8/1999 | Wada et al. | |
| 6,009,114 A * | 12/1999 | Heller et al. ................ | 372/75 |
| 6,028,881 A | 2/2000 | Ackerman et al. | |
| 6,091,744 A | 7/2000 | Sorin et al. | |
| 6,275,317 B1 | 8/2001 | Doerr et al. | |
| 6,295,305 B1 * | 9/2001 | Matsumoto et al. ........ | 372/19 |
| 6,341,139 B1 | 1/2002 | Ohtsuka et al. | |
| 6,389,047 B1 | 5/2002 | Fischer | |
| 6,847,662 B2 | 1/2005 | Bouda et al. | |
| 7,106,920 B2 | 9/2006 | Liu | |
| 7,120,175 B2 | 10/2006 | Rothenberg et al. | |
| 2006/0176914 A1 * | 8/2006 | Bacher et al. ................ | 372/22 |
| 2007/0274364 A1 * | 11/2007 | Brown et al. ................ | 372/71 |

OTHER PUBLICATIONS

A Tunable Emerald Laser, by Michael L. Shand, et al., IEEE Journal of Quantum Electronics, vol. QE-18, No. 11, Feb. 1982.
CW Laser Pumped Emerald Laser, by Michael L. Shand, et al., IEEE Journal of Quantum ELectronics, vol. QE-20, No. 2, Feb. 1984.
Highly Efficient Laser, by S.T. Lai, Journal of Optical Society of America, B, vol. 4, No. 8, Aug. 1987.
Detection of Biological Agents, by Charles A. Primmerman, Lincoln Laboratory Journal, vol. 12, No. 1, 2000, pp. 3- 32.
Ultraviolet Biological Trigger Lidar, located on the Internet at http://www.sesi-md.com/UV-bio-trigger-lidar.html.

\* cited by examiner

*Primary Examiner* — Tod T Van Roy
(74) *Attorney, Agent, or Firm* — Lawrence E. Anderson

(57) ABSTRACT

Laser systems and related methods are provided. In this regard, a representative laser system includes: a laser diode array that generates light; a first crystal having a cavity; an optical element operative to focus the generated light onto the first crystal such that the light generates a high-power circulating beam within the cavity; a second crystal positioned with respect to the first crystal such that the frequency of the high-power circulating beam is doubled; and a first coating applied to the first crystal and second coating applied to the second crystal, the first coating and the second coating being operative to cause at least a portion of the beam to be emitted within a particular wavelength range of the generated light.

13 Claims, 5 Drawing Sheets

WAVELENGTH SELECTABLE LASER SYSTEMS AND RELATED METHODS

GOVERNMENT INTEREST

The invention described herein may be manufactured, used, and licensed by or for the United States Government.

BACKGROUND

Many bio-molecules absorb light in the UV range and fluoresce under the beam of a laser. Because of this attribute, UV optical lasers can be used in analytical devices for the biotechnology, pharmaceutical, and medical markets, solid state white lighting, sterilization and disinfectant devices, and water purification systems. It has been a longstanding goal to shrink the large and expensive lasers that are currently used in bio-agent detection systems.

The wavelength range of 337.5 nanometers (nm) to 450 nm (hereinafter the "wavelength range") is of interest in the field of spectroscopy for the detection of proteins such as tryptophan, Nicotinamide Adenine Dinucleotide (NADH) and flavin compounds. However, there exists a lack of selectable wavelength laser sources for emitting light in this wavelength range. Note that a "selectable wavelength laser" refers to a laser for which the user can select the wavelength of the emission during the manufacturing process.

Indium Gallium Nitride (InGaN) lasers and Aluminum Gallium Nitride (AlGaN) lasers are capable of emitting continuous and pulsed light in this wavelength range. However, InGaN/AlGaN lasers are costly to produce.

Previously, emerald lasers have been made and used at the wavelength of 765 nm. However, the application of such lasers has historically been hampered by the need for large, high quality crystals that are slowly grown by a hydrothermal method and pumped by high power flash lamps.

An example of an emerald laser is disclosed in "CW Laser pumped Emerald Laser," by Shand, et al, IEEE Journal of Quantum Electronics, Vol. QE-20, No. 2, February 1984, wherein a continuous wave (CW) laser pumped emerald laser is described using an emerald sample having a 2.8 mm length and 3.8×5.1 mm cross section with 1.8 atm percent Cr pumped longitudinally by a CW laser at 647.1 nm. The fraction of pump photons converted into laser photons, or quantum efficiency was 69 percent, which the author attributed to optical loses in the cavity. The output laser wavelength was 765 nm and was polarized parallel to the 5.1 mm sample edge, which contained a projection of the c-axis. The observed tuning range of the emerald laser was reported as 728.8-809.0 nm, which did not cover the entire fluorescence range of emerald (700-850 nm), a fact that the author attributed to the excited state absorption of the laser photons. Another publication entitled "A Tunable Emerald Laser," by Shand, et al., IEEE Journal of Quantum Electronics, Vol. QE-18, No. 11, February 1982, discloses a laser oscillator made with a 19×4 mm diameter rod, with the c axis at approximately 45 degrees to the rod axes. The optical cavity was formed with a high reflector and a 95 percent reflectivity output coupler. The described laser was reported as having emitted 6.8 mJ at 757.4 nm. The laser had large loses (approximately =0.11 $cm^{-1}$), presumably due to the beam breakup which was attributed to planes in the crystal having slightly different indexes of refraction. In the article entitled "Highly Efficient Emerald Laser," by Lai, Journal of the Optical Society of America, B, Vol. 4, No. 8, August 1987, an emerald laser is described with peak-emission cross section of $3.1 \times 10^{-20}$ $cm^2$ at room temperature. A 76% laser quantum yield was measured with lasing at 768 nm.

In the past, efforts have been made to provide for doubling crystals. For example, U.S. Pat. No. 4,982,405 to Zayhowski, et al., which is hereby incorporated by reference.

Efforts have also been made to provide semiconductor-laser-pumped solid state lasers, with an increased focus towards miniaturization, increasing the output power and improving beam quality. An example of a laser diode pumped solid state laser is shown, for example, in U.S. Pat. No. 6,341,1390 to Baer, et al., hereby incorporated by reference, Baer, et al., discloses the use of a neodymium or other rare earth doped solid state (RE:solid) laser which is pumped by a matched high efficiency laser diode. The intra-cavity frequency doubled RE:solid assembly of Baer, et al., produces a laser beam output in the visible spectrum near infrared. A further example of a laser pumped solid state laser is shown in U.S. Pat. No. 6,341,139 to Ohtsuka, et al., hereby incorporated by reference, wherein a semiconductor-laser-pumped solid state laser includes a solid state laser medium doped with a rare earth element such as neodymium and a semiconductor laser which emits a pumping laser beam for pumping the solid state laser medium.

SUMMARY

This invention describes a new method of attaining continuous (CW) ultraviolet laser emission from 337.5 nm to 450 nm in a very compact format. Laser systems and methods are provided. In this regard, an exemplary embodiment of a laser system comprises: a laser diode array that generates light; a first crystal having a cavity; an optical element operative to focus the generated light onto the first crystal such that the light generates a high-power circulating beam within the cavity; a second crystal positioned with respect to the first crystal such that the frequency of the high-power circulating beam is doubled; and a first coating applied to the first crystal and second coating applied to the second crystal, the first coating and the second coating being operative to cause at least a portion of the beam to be emitted within a particular wavelength range of the generated light.

Another exemplary embodiment of a laser system comprises: a laser diode array that generates light; a first crystal; an optical element operative to focus the generated light onto the first crystal such that the light generates a high-power circulating beam within the cavity; a first coating applied to the first crystal; a second crystal positioned with respect to the first crystal such that the frequency of the high-power circulating beam is doubled; and a second coating applied to the second crystal, the second coating being operative to cause at least a portion of the beam to be emitted as ultraviolet light within a wavelength range of between approximately 337.5 nm and 450 nm.

An exemplary embodiment of a method can be broadly summarized by the following steps: generating light; focusing the generated light onto a first crystal via an optical device; exciting the atoms in the first crystal thereby generating a high-power circulating beam; doubling the frequency of the high-power circulating beam via a second crystal bonded to the first crystal; and emitting a portion of the beam based upon a first coating and a second coating on the first and second crystals, respectively.

One embodiment of the present invention utilizes a very small high optical-quality emerald crystal that is commercially available and is pumped by a commercially available 650 nm red diode laser array. The present invention may be used for light shows, pathogen detection, encryption, and fluorescence studies.

The present invention takes the tunable aspect and high gain/high chromium concentration of emerald and transforms it from an expensive, difficult-to-fabricate device into a useful, cost effective device using diode pumped solid state laser (DPSS) construction technology. The present invention utilizes in a novel manner a 650 nm diode laser array for a pump laser for emerald.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure generally relates to systems and methods for attaining continuous (CW) and Q-switched (pulsed) ultraviolet (UV) laser emission in the 337.5 nm to 450 nm wavelength range (hereinafter the "wavelength range"). Note that a "continuous wave" laser refers to a laser that emits light having a constant amplitude and constant frequency, whereas a "Q-switched" laser refers to a laser that emits pulsed light. In some embodiments, the system comprises an emerald crystal excited by a laser array that produces light in the wavelength range.

Figure 1:
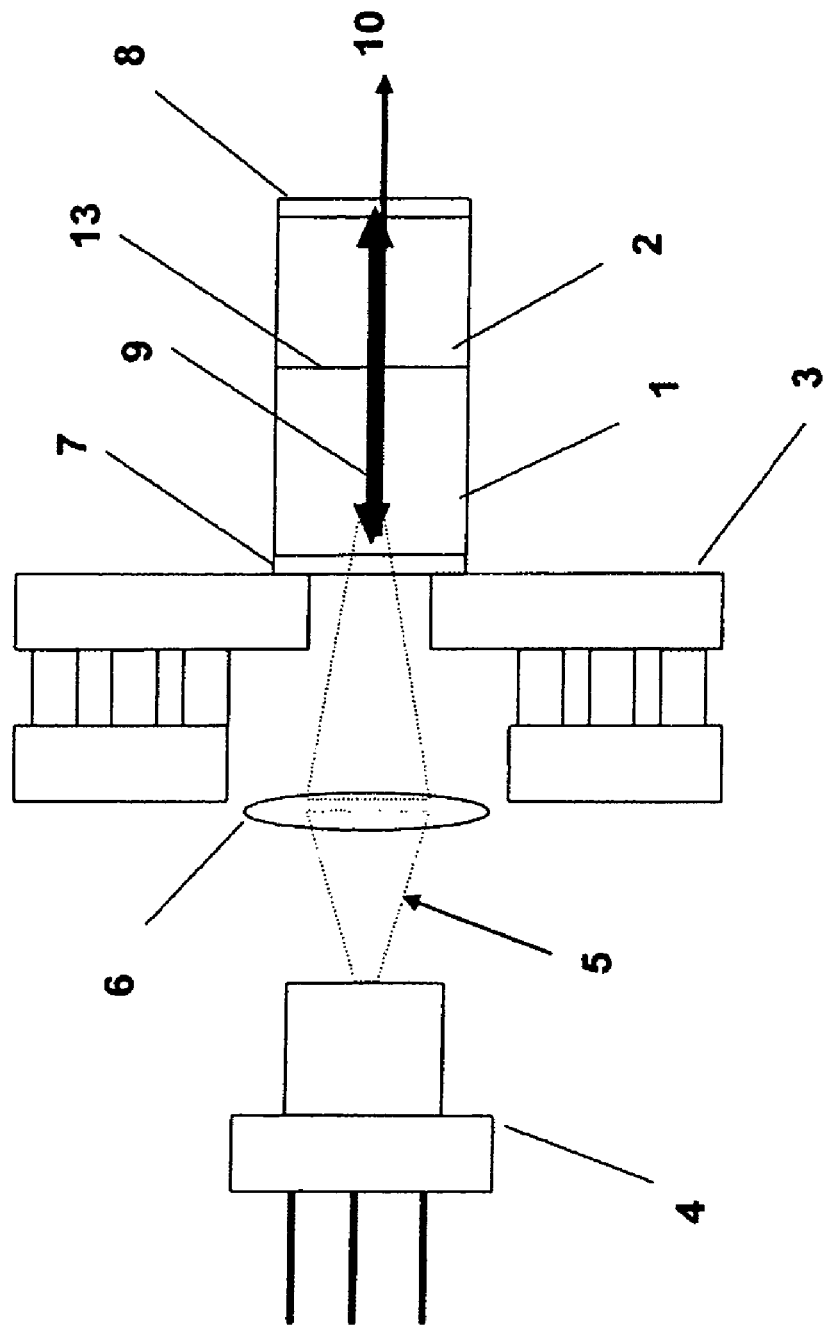
FIG. 1 depicts an exemplary embodiment of a laser device.

FIG. 1 depicts an embodiment of a wavelength selectable laser device 11. The laser device 11 comprises a first crystal 1 coupled to a second crystal 2.

In one embodiment, crystal 1 is a 2 millimeter (mm) square, 2.5 mm long crystal of chromium doped hydrothermally grown synthetic beryl $[Be_3Al_2(SiO_3)_6:Cr^{3+}]$, commonly known as emerald. Additionally, crystal 2 is a beta-$BaB_2O_4$ (BBO) or a $LiB_3O_5$ (LBO) frequency doubling crystal, which is also about 2 mm square and about 2.5 mm long.

The emerald crystal 1 has bonded to it the beta-$BaB_2O_4$ (BBO) or a $LiB_3O_5$ (LBO) frequency doubling crystal 2, set up in an intracavity frequency doubling configuration to increase efficiency. Crystal 1 and crystal 2 are placed adjacent to each other and may be bonded together with a bonding substance 13, such as a cyanoacrylate optical adhesive, for example. The emerald crystal is coated at the rear face with high-reflection coatings from 729 nm to 809 nm, and from 364 nm to 405 nm, chosen to optimize reflection or transmission for the desired emission wavelength. An antireflection coating at 650 nm is also deposited on the rear face 7 to optimize coupling of the pump laser into the emerald crystal. In a first embodiment, coating 7 may be composed of alternating layers of dielectrics such as $SiO_2$ and $MgF_2$. The emerald crystal is coated on the front (emitting) face with high-reflection coatings from 729 nm to 809 nm, and antireflection coatings from 364 nm to 405 nm, also composed of $SiO_2$ and $MgF_2$. The laser is effectively tuned by selecting the proper coating thicknesses that maximize intracavity power/energy for the fundamental wavelength, and provide maximum transmission for the harmonic (output wavelength) desired. This is standard established practice in laser mirror fabrication technology. The laser is pumped by a 500 mW 650 nm diode laser array 4, focused by a lens 6 into the rear of the crystal 1. While the laser is pumped by the diode laser, a high-power circulating beam exists within the cavity 9. The second harmonic frequency 10 emerges through the output coating 8. The peak of the output spectrum lies at approximately 382.5 nm but is wavelength selectable from 364 nm to 405 nm, with decreased output efficiency toward the upper and lower wavelength limit.

In one embodiment, the coating 7 comprises a high-reflection coating from 729 nm to 809 nm, chosen to optimize reflection or transmission for the desired emission wavelength and an antireflection coating at 650 nm to optimize coupling laser light with crystal 1. In addition, in one embodiment, crystal 2 is coated on its emitting face with a coating 8, which may be composed of alternating layers of dielectrics such as $SiO_2$ and $MgF_2$ comprising a high-reflection coating from 729 nm to 809 nm and an antireflection coating from 364 nm to 405 nm.

Notably, the laser device 11 is manually tuned by selecting coating thicknesses (wavelengths) capable of producing output wavelength desired. To allow escape of the 375 nm UV light, antireflection coatings for 375 nm are deposited on surface 8.

The laser device 11 further comprises a heat sink 3 to which crystal 1 is mounted. In one embodiment, the heat sink 3 is a thermoelectrically (Peltier) temperature controlled heat sink.

The laser device 11 further comprises and is pumped by a laser diode array 4. Note that "pumped" refers to the excitation of atoms in crystal 1 by light produced by laser diode array 4 and introduced to crystal 1. In one embodiment, the laser diode array 4 is a 500 mW 650 nm red diode laser array, and the light 5 emitted from the array 4 is focused onto crystal 1 and through the coating 7 by an optical element 6, such as a lens, for example. When powered, the laser diode array 4 produces the light indicated by reference line 5.

Figure 2:
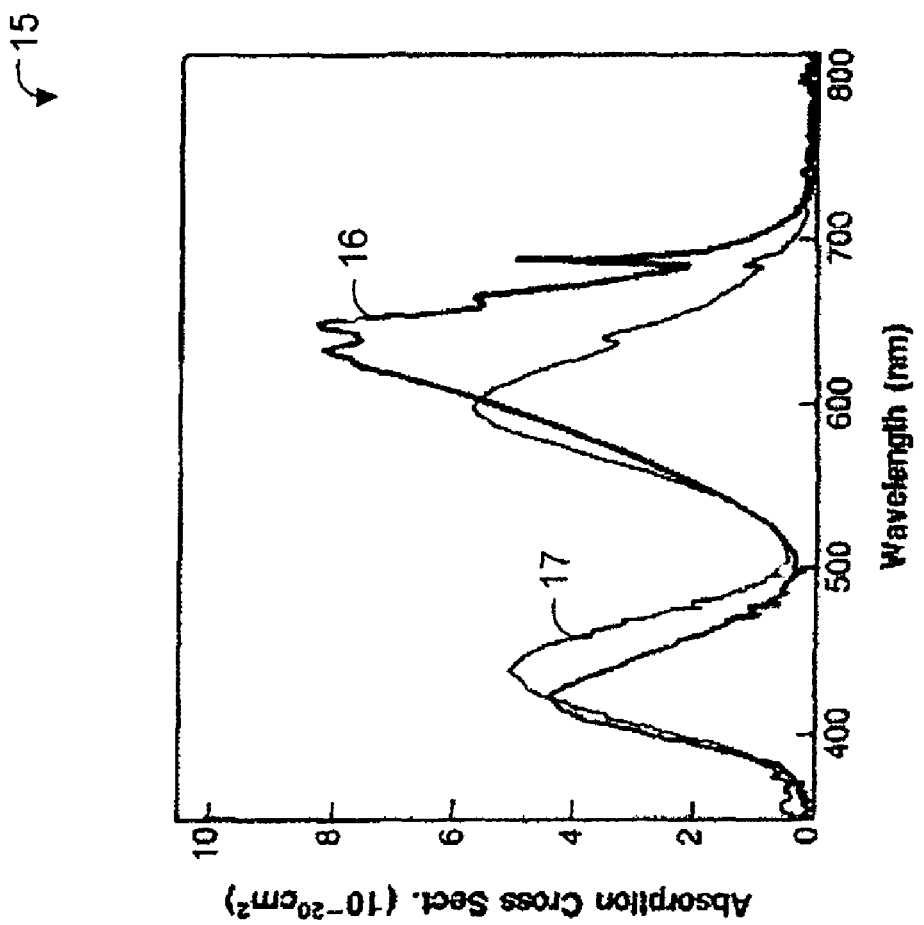
FIG. 2 is a graph depicting absorption cross-sectional area versus wavelength for a laser device such as the device depicted in FIG. 1

In the publication entitled "Highly Efficient Emerald Laser," by S. T. Lai, Journal Optical Society of America, the high efficiency of a Cr-doped emerald laser is discussed. The laser efficiency is analyzed according to three aspects of laser operation: (a) absorption of the pump light followed by (b) fluorescence and stimulated emission and (c) laser action. Regarding absorption, the energy levels of the optically active $Cr^{3+}$ ions are known. Two broad absorption bands $^4T_2$ and $^4T_1$, in emerald cover significant portions of the visible spectrum as shown in FIG. 2. The absorption cross sections were calculated based on Cr concentration measured by neutron-activation method. The peak-absorption cross sections of the $^4T_2$ band polarized along the c-axis and polarized perpendicular toe the c-axis are $8.26 \times 10^{-20}$ cm$^2$ at 650 nm and $5.6 \times 10^{-20}$ cm$^2$ at 600 nm. Emerald has the capacity to incorporate high Cr concentrations, up to 5%, without compromising crystal quality. It is desirable to fabricate the crystal with as high a concentration of the active chromium dopant as possible. With respect to fluorescence of the emerald laser, as described in the publication entitled "Highly Efficient Emerald Laser," by S. T. Lai, Journal Optical Society of America, the six fold coordinated oxygen bonds at the Cr ion distorted from a perfect octahedron and there is only a single type of Cr site in emerald, unlike in some Cr-doped laser materials such as SrAlF$_5$ in which some of the sites are nonradiative, which results in lower efficiency. Because of the low laser threshold and high quantum yield in laser pumped emerald lasers, there is a resulting efficiency comparable to that of alexandrite, which has a quantum efficiency of about 95%. As to laser action, in emerald lasers, the lower bound of the laser tuning range (720 nm) is limited by the ground-state absorption process. The round-trip laser loss, excluding the excited-state absorption (ESA) of a high efficient emerald laser is 0.4%/cm, as reported in the publication entitled "Highly Efficient Emerald Laser," by S. T. Lai, Journal Optical Society of America.

In FIG. 2, the absorption cross section versus wavelength is shown. Curve 16 shows the absorption cross section parallel to the c-axis (optical axis); curve 17 shows the absorption cross section perpendicular to the c-axis of the emerald crystal 1 The emerald crystal 1 is oriented so that the polarized emission from the 650 nm pump laser array 4 (vertical line at 650 nm as shown in FIG. 2) is parallel to the c-axis of the emerald crystal. This allows maximum absorption of the 650 nm pump radiation. An absorption peak occurs at 650 nm, as shown in FIG. 2. Commercially available 650 nm laser diodes are ideally suited for the laser array 4.

When the light from the pump laser array 4 indicated by reference line 5 enters crystal 1, the crystals 1 and 2 generate a high-power circulating beam within a cavity 9 (shown by the dual pointed arrow ⇆) formed by the emerald gain medium and the bonded nonlinear UV-generating medium. A second harmonic frequency beam of the high-power beam emerges through the coating 8, as represented by the arrow 10.

In one embodiment, the amplitude peak of the spectrum of the beam 10 lies at approximately 382.5 nm, but the beam's wavelength is selectable from 364 nm to 405 nm. Note that the device 11 exhibits decreased efficiency as it operates toward the upper (405 nm) and lower (364 nm) wavelengths.

Figure 3:
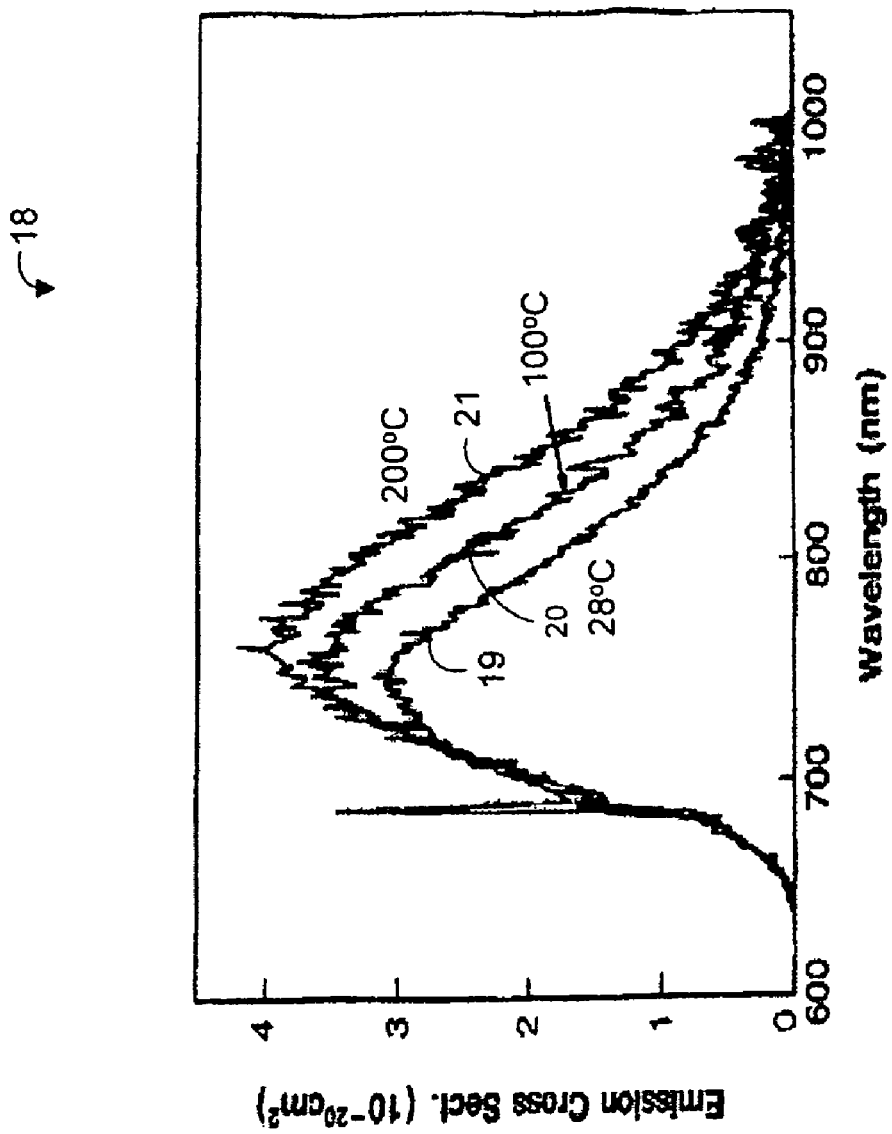
FIG. 3 is a graph depicting emission cross-sectional area versus wavelength for a laser device such as the device depicted in FIG. 1

FIG. 3 is a graph 18 that depicts the emission cross section of the crystal 1 versus wavelength as the temperature increases. As illustrated in FIG. 3, as the temperature increases, the emission cross section increases. The plotted line 19 depicts the emission cross section versus wavelength at 28° C., plotted line 20 depicts the emission cross section versus wavelength at 100° C. and plotted line 21 depicts the emission cross section versus wavelength at 200° C. Laser emission from the emitting level relies on electrons thermally excited from the storage level to the emitting level. In other words, when the excited atoms return to their respective storage levels, they emit energy in the form of photons, i.e., light. As temperature increases, the number of atoms excited increases, and the emission cross section increases. Temperature increase is a great advantage in constructing a practical device, and it is important not to keep the device at an impractically low temperature. According to a preferred embodiment of the present invention, crystals within the device 11 may operate at or above 100 degrees Celsius indefinitely.

Notably, alternative embodiments differ as to the operating temperature. The optimum temperature is set for the desired output wavelength, depending upon which frequency doubling crystal 2 (LBO or BBO) is selected.

Figure 4:
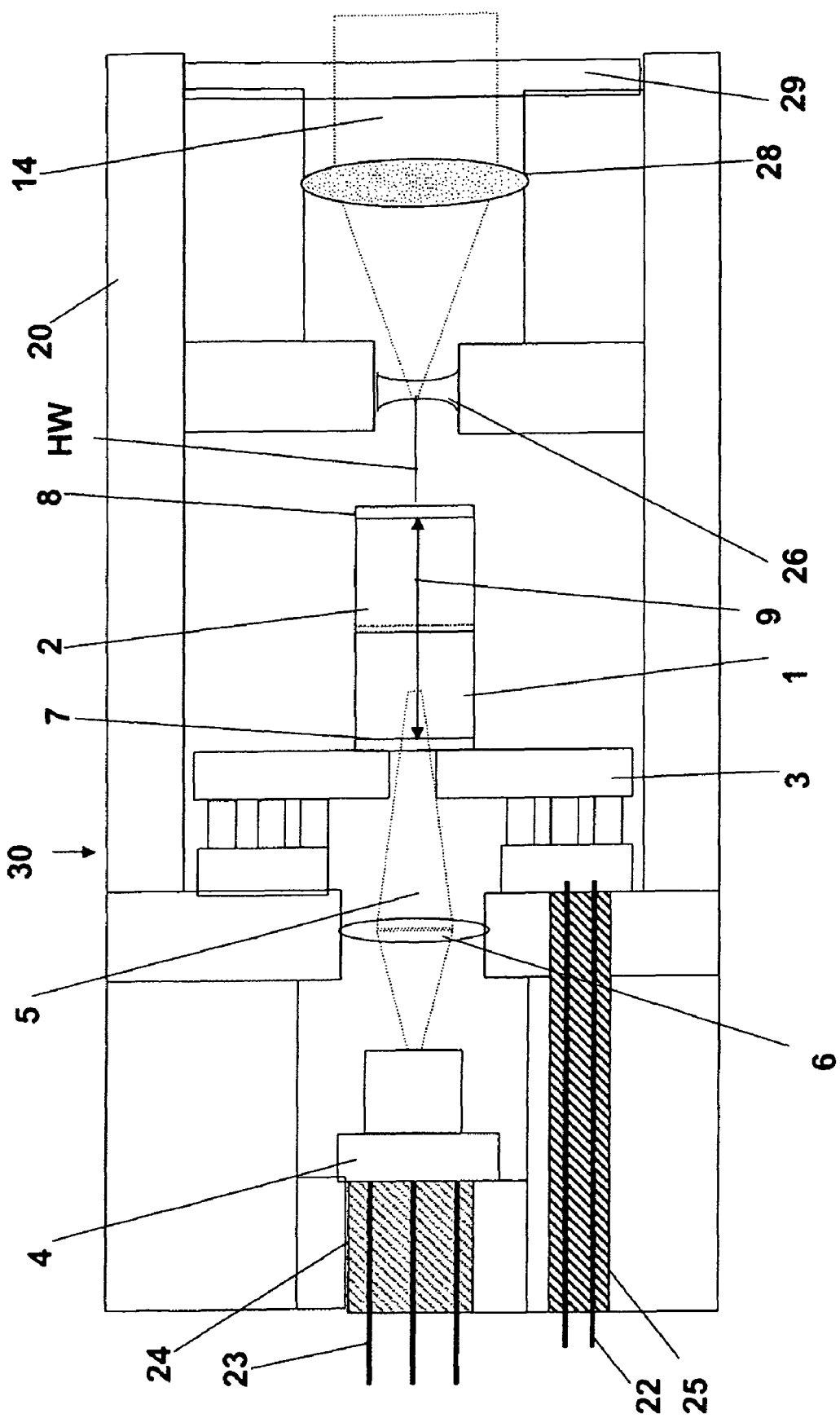
FIG. 4 depicts a laser system incorporating a laser device such as the device depicted in FIG. 1.

FIG. 4 depicts a laser system 30 comprising the laser device 11 enclosed inside a hermetically sealed housing 20. As indicated hereinabove, the device 11 comprises emerald crystal 1 adjacent to the BBO doubling crystal 2 (which may be bonded together as described in the foregoing) mounted on a Peltier cooler 3, fed and monitored by electrodes and thermocouple 22 that are insulated from the metallic housing by an electrically insulating nonconducting material 25. The pump laser 4 emitting >500 mW at 650 nm is fed and monitored by electrodes 23. The 650 nm pump laser (or light) is focused onto the emerald crystal 1 by a convex lens 6. The frequency doubled (364 to 405 nm) coherent light (shown by the line HW) in FIG. 4 is first expanded by a diverging concave lens 28. The residual 650 nm pump light and 729 to 809 nm fundamental emission from the emerald crystal 1 is absorbed by a high-pass optical filter 29 that allows coherent light 14 to be emitted from the device.

During operation, light indicated by reference line 5 produced by the laser diode array 4, for example 650 nm light, is focused onto the emerald crystal 1 by the optical element 6. As described hereinabove, crystal 2 is operative to double the frequency of the light, for example from 650 nm to 364 nm coherent light, and emit light HW (harmonic wavelength).

The emitted light from the doubling crystal 2 is expanded by a diverging concave lens 26 and re-collimated by a convex lens 28. The system further comprises a high-pass optical filter 29. When the light 14 passes through the high-pass optical filter 29, the high-pass filter 29 absorbs any residual 650 nm light from the laser diode 4. Additionally, the high-pass filter 29 absorbs 675 nm to 900 nm fundamental emissions from crystal 1, for example an emerald crystal. In this regard, the high-pass optical filter 29 allows those wavelengths, for example 364 nm to 405 nm coherent light, to be emitted from the system 30.

As an example, the output power of the system 30 can be estimated by first calculating the power of the beam 10 within the crystal 1. The saturation intensity of crystal 1 is calculated using the following equation:

$$I_{SAT} = h\nu/\sigma_{em} t, \qquad \text{Equation 1}$$

where $I_{SAT}$ is the saturation intensity (Wcm$^{-2}$); h$\nu$ is the photon energy at the laser frequency ($2.633 \times 10^{-19}$ J); $\sigma_{em}$ is the emission cross section ($2 \times 10\text{-}20$ cm$^2$); and t is the excited state lifetime ($60 \times 10^{-6}$ sec).

Further, the circulating power within the cavity 9 of the beam is calculated using the following equation:

$$I_{CIRC} = I_{SAT}[2\ g_0 L/S - \ln R - 1], \qquad \text{Equation 2}$$

where $g_0$ is the single pass gain (0.1 cm$^{-2}$), L is the length of the gain medium (0.5 cm); S is the Findlay-Clay insertion losses (0.004); and $-\ln R$ is the natural logarithm of the reflectivity of the output coupler assuming a 5% loss from the second harmonic generation output beam 14 ($-\ln 0.95 = -0.05$). Therefore, the circulating power may be calculated as follows:

$$I_{CIRC} = I_{SAT}[2(0.1\ \text{cm-2})(0.5\ \text{cm})/(0.004) - \ln 0.95 - 1];$$

$$I_{CIRC} = I_{SAT}(1.85) = 2.8 \times 10^5\ \text{W}.$$

The total power is then multiplied by the area of the crystal 1, e.g., $2 \times 10^{-5}$ cm$^2$, giving a total circulating power within the cavity 9 of 5.5 W. Thus, the fundamental emissions from crystal 1 described hereinabove, e.g., the 675 nm to 900 nm, are absorbed, and a portion, e.g., 1%-5% is converted to the second harmonic beam 14, e.g., 337.5 nm to 450 nm, yielding an output power from 55 mW to 280 mW. Such power is output if a double pass is made through crystal 1. In this regard, some of the wavelengths will be absorbed by crystal 1, so a single pass through the doubling crystal 2 will yield 27.5 mW to 140 mW CW power at the peak of the beam 14.

Figure 5:
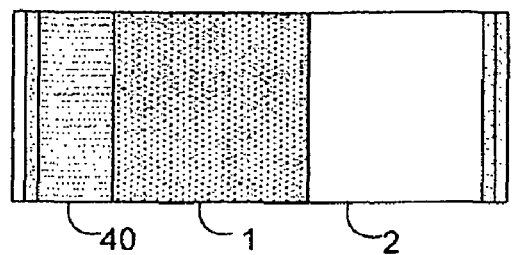
FIG. 5 depicts another embodiment of crystal arrangement for a laser device such as the device depicted in FIG. 1.

As shown in FIG. 5, in another embodiment of the system 30, crystal 1 may be bonded to crystal 2, as described hereinabove. In addition, however, a q-switching element 40 may be bonded to crystal 1. An example of a coupled-cavity Q-switched laser is disclosed in U.S. Pat. No. 4,982,405, hereby incorporated by reference.

In one embodiment of the present invention, the q-switching element 40 may be a Cr:YSO(Cr$^{4+}$:Y$_2$SiO$_5$) passive q-switching element. The q-switching element 40 accumulates the energy produced within the cavity 9 and releases the energy at once thereby creating pulses of light, as opposed to a continuous wave, as described hereinabove.

In this regard, as long as the absorption cross section of the passive q-switching element 40 exceeds the emission cross section of the crystal 1, pulsing will occur. As an example, if the absorption cross section of the q-switching element 40 is $7 \times 10^{-19}$ cm$^2$ and the emission cross section of crystal 1 is $3-4 \times 10^{-20}$ cm$^2$, then the q-switching absorption is greater than the emission cross section of crystal 1. Thus, q-switching will occur at a particular rate, for example $10^3$-$10^4$ Hertz, and the output energy will be in the $10^{-3}$ joule range.

Figure 6:
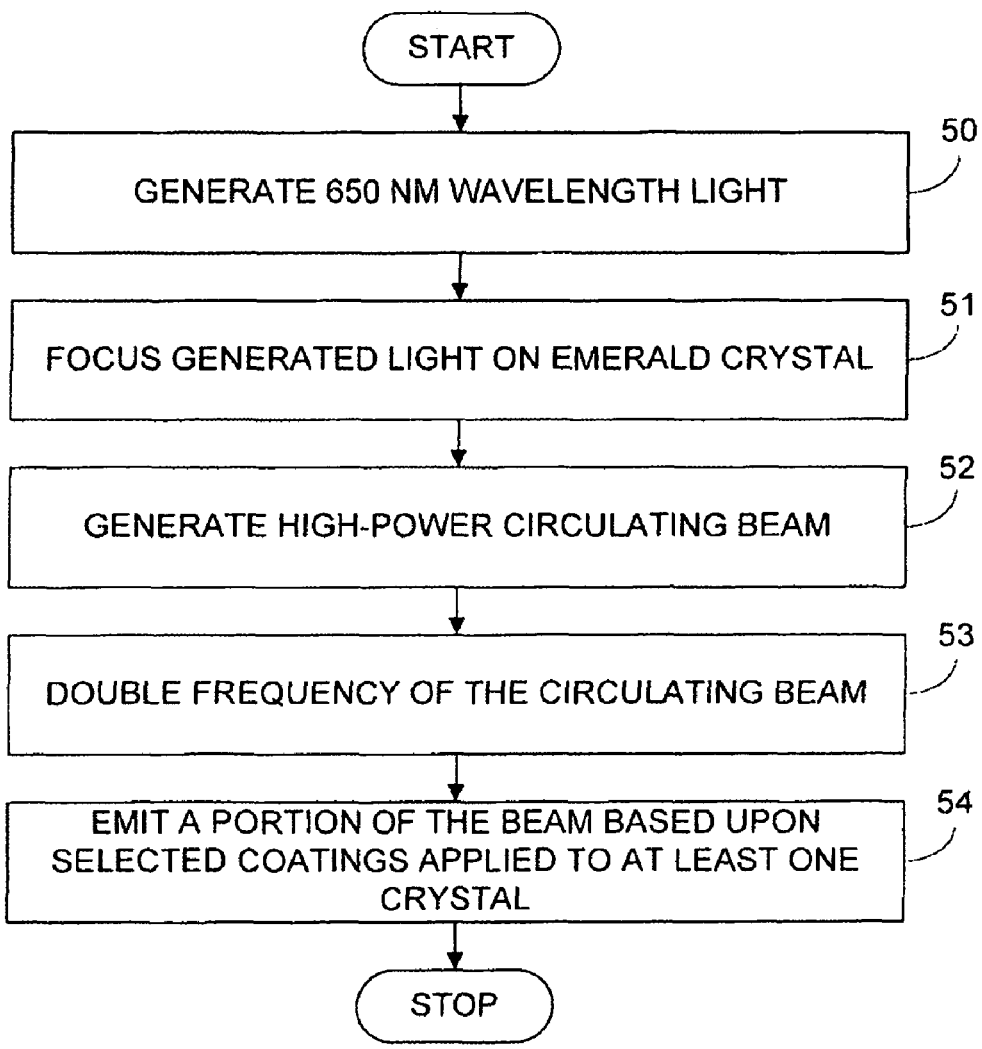
FIG. 6 is a flowchart depicting an embodiment of a method of generating selectable wavelength emissions.

FIG. 6 illustrates a method of system 30 (FIG. 4) for generating selectable wavelength emissions in accordance with an embodiment of the present disclosure. First, the system 30 generates light exhibiting a 650 nm wavelength, as indicated in step 50. The 650 nm wavelength light may be generated, for example, by a laser diode array 4 (FIGS. 1 and 4).

The system 30 focuses the 650 nm generated light onto a first crystal 1 (FIGS. 1 and 4) via an optical device 6, as indicated in step 51. In one embodiment, as described hereinabove, the optical element 6 is a simple lens that directs the light to the first crystal 1, and crystal 1 is a commercially-available synthetic emerald crystal.

The light 5 that is focused on crystal 1 excites the atoms in crystal 1 thereby generating a high-power circulating beam within cavity 9, as indicated in step 52. The system 30 then doubles the frequency of the high-power circulating beam within cavity 9, as indicated in step 53. Such doubling may be performed by a frequency-doubling crystal bonded to crystal 1, which is described with reference to FIG. 1.

The system 30 then emits a portion of the beam based upon the coatings 7 and 8 (FIG. 1) that are applied to crystal 1 and crystal 2, respectively, as indicated in step 54.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A laser system comprising:
a laser diode for generating a light beam;
a chromium-doped hydro-thermally grown synthetic crystal having a first optical cavity;
first reflective means positioned between the laser diode and the first optical cavity; the first reflective means comprising high-reflection coatings for reflecting light in the wavelength range from 729 nm to 809 nm and from 364 nm to 405 nm and an antireflection coating at 650 nm;
an optical element operative to focus the generated light beam onto the first reflective means and into said first optical cavity to create a light beam such that the light beam from the laser diode is directly inputted into the optical cavity of the chromium-doped hydro-thermally grown synthetic crystal through the optical element and first reflective means; a second crystal having a second optical cavity positioned in alignment with the first optical cavity such that the frequency of the light beam is doubled; the second crystal being bonded to the chromium-doped hydro-thermally grown synthetic crystal and having an emitting face which is coated with second reflective means comprising alternating layers of SiO$_2$ and MgF$_2$ to produce a high-reflection coating in the wavelength range from 720 nm to 809 nm and an anti-reflection coating in the wavelength range from 364 nm to 405 nm; the second reflective means operating to manually tune the laser system to produce the output wavelength desired, the second reflective means also being operative to cause at least a portion of the beam to be emitted as ultraviolet light within an approximate wavelength range of between 337.5 nanometers and 450 nanometers;
a q-switching element positioned between the first reflective means and the chromium-doped hydro-thermally grown synthetic crystal,
whereby the first reflective means, the q-switching element, the chromium-doped hydro-thermally grown synthetic crystal, the second crystal and the second reflective means form a compact integral unit which emits light in the wavelength range of 364 nm to 405 nm; and wherein the laser system is manually tuned to emit 375 nm UV light by depositing antireflection coatings for 375 nm on the second reflective means.

2. A laser system comprising:
a laser diode for generating a light beam;
a chromium-doped synthetic beryl (Be$_3$Al$_2$(SiO$_3$)$_6$Cr$^{3+}$) crystal having a first optical cavity; the chromium-doped synthetic beryl (Be$_3$Al$_2$(SiO$_3$)$_6$Cr$^{3+}$) crystal being oriented such that polarized emission from the laser diode is parallel to its c-axis;
first reflective means positioned between the laser diode and the first optical cavity; the first reflective means is a coating composed of alternating layers of dielectrics SiO$_2$ and MgF$_2$;
an optical element operative to focus the generated light beam onto the first reflective means and into said first optical cavity to create a light beam such that the light beam from the laser diode is directly inputted into the optical cavity of the chromium-doped hydro-thermally grown synthetic crystal through the optical element and first reflective means;
a second crystal having a second optical cavity positioned in alignment with the first optical cavity such that the frequency of the light beam is doubled; the second crystal having an end surface, and
a second reflective means adjacent to the second crystal, the second reflective means operating to manually tune the laser system to produce the output wavelength desired, the second reflective means also being operative to cause at least a portion of the beam to be emitted as ultraviolet light within an approximate wavelength range of between 337.5 nanometers and 450 nanometers.

3. The laser system of claim 2 wherein the diode laser comprises a 650 nm diode laser array and the peak of the beam emitted from the second laser is approximately 382.5 nm, but is wavelength selectable within an approximate range of 364 nm to 405 by varying the second reflective means.

4. A laser system comprising:
a semiconductor laser diode for generating a pumping laser light beam;
a chromium-doped synthetic beryl $(Be_3Al_2(SiO_3)_6Cr^{3+})$ crystal having a first optical cavity;
first reflective means positioned between the laser diode and the first optical cavity;
an optical element operative to focus the generated light beam onto the first reflective means and into said first optical cavity to create a light beam such that the light beam from the laser diode is directly inputted into the optical cavity of the chromium-doped hydro-thermally grown synthetic crystal through the optical element and first reflective means;
a second crystal having a second optical cavity positioned in alignment with the first optical cavity such that the frequency of the light beam is doubled; the second crystal having an end surface,
a second reflective means adjacent to the second crystal, the second reflective means operating to manually tune the laser system to produce the output wavelength desired, the second reflective means also being operative to cause at least a portion of the beam to be emitted as ultraviolet light within an approximate wavelength range of between 337.5 nanometers and 450 nanometers and
a holder, wherein a pumping light incident side end face of the chromium-doped hydro-thermally grown synthetic beryl $(Be_3Al_2(SiO_3)_6Cr^{3+})$ crystal is bonded to a first side of said holder and wherein the holder is provided with a through hole from the first side of said holder to a second side of said holder through which the pumping laser beam impinges upon the pumping light incident side end face of the chromium-doped synthetic beryl (Be3Al2(SiO3)6Cr3+) crystal; the chromium-doped synthetic beryl crystal being positioned within the holder such that polarized emission from the laser diode is parallel to the c-axis of the synthetic beryl crystal to provide maximum absorption of the pumping laser beam; and wherein said through hole has a first cross-sectional area on the first side of said holder and a second cross-sectional dimension different from the first cross-sectional area on the second side of said holder.

5. The laser system of claim 4, wherein the chromium-doped synthetic beryl (Be3Al2(SiO3)6Cr3+) crystal is a beryl laser that is approximately 2 millimeter square and from approximately 2.5 millimeters to 4.0 millimeters in length and the second crystal is either beta-$BaB_2O_4$ (BBO) or a $LiB_3O_5$ (LBO) frequency doubling crystal.

6. The laser system of claim 5, wherein the chromium-doped synthetic beryl (Be3Al2(SiO3)6Cr3+) crystal is mounted to a thermoelectrically temperature-controlled heat sink.

7. The system of claim 6, wherein the chromium-doped synthetic beryl (Be3Al2(SiO3)6Cr3+) crystal is bonded to the second crystal so as to form an integral unit with the temperature controlled heat sink to permit heat transfer away from both of the crystals so that the system may operate at or above 100 degrees Celsius indefinitely;
and wherein the first reflective means comprises high-reflection coatings from 729 nm to 809 nm and from 364 nm to 405 nm and an antireflection coating at 650 nm and provides a high reflection of light from approximately 729 nm to 809 nm, while allowing light from the light generator at 650 nm to pass;
the second reflective means comprising alternating layers of $SiO_2$ and $MgF_2$ to produce a high-reflection coating in the wavelength range from 720 nm to 809 nm and an antireflection coating in the wavelength range from 364 nm to 405 nm so as to provide a high reflection of light from approximately 729 nm to 809 nm, while allowing light within the range of 364 nm to 405 nm to pass.

8. A method for generating selectable wavelength emissions, comprising the steps of;
generating a beam of light using a laser diode array;
focusing the generated light beam such that the focused light beam from the laser diode array is directly inputted into an optical cavity of a hydro-thermally grown chromium-doped synthetic beryl (Be3Al2(SiO3)6Cr3+) crystal that is 2 millimeter square in cross-section and from 2.5 millimeters to 4.0 millimeters in length and having a first reflective coating thereon which allows passage of the generated beam of light and reflects light within an approximate wavelength range of 729 nm to 809 nm;
doubling the frequency of the light beam via a second crystal having a second reflective coating thereon; the second crystal being either a beta-$BaB_2O_4$ (BBO) or a $LiB_3O_5$ (LBO) frequency doubling crystal;
emitting a portion of the beam based upon the second reflective coating on the second crystal which allows passage of ultraviolet light; and
controlling heat generated by the synthetic chromium-doped hydro-thermally grown beryl crystal via a temperature controlled heat sink; the temperature controlled heat sink forming an integral unit with the synthetic chromium-doped hydro-thermally grown beryl crystal to permit heat transfer so that the system may operate at or above 100 degrees Celsius indefinitely.

9. The method of claim 8 wherein the first reflective coating comprises layers producing a high-reflection of light in the wavelength ranges from 729 nm to 809 nm and from 364 nm to 405 nm and the passage of light due to an antireflection layer at 650 nm; and wherein the second reflective coating comprises alternating layers of $SiO_2$ and $MgF_2$ layers to produce a high-reflection of light in the wavelength range from 720 nm to 809 nm and an antireflection layer in the wavelength range from 364 nm to 405 nm so as to provide a high reflection of light from approximately 729 nm to 809 nm, while allowing light within the range of 364 nm to 405 nm to pass; the light passing through a lens assembly having a diverging concave lens and a collimating convex lens, the lens assembly being operative to shape the beam; and
wherein the synthetic beryl crystal is bonded to the frequency doubling crystal to form an integral compact laser unit within a chamber which is hermetically sealed; and
wherein the emitted light is used for pathogen detection.

10. A laser system comprising:
a laser diode array that generates light;
a chromium-doped synthetic beryl crystal having a cavity;
an optical element operative to focus the generated light such that the light beam from the laser diode array is directly inputted into the cavity of the chromium-doped synthetic beryl crystal and such that the light generates a high-power circulating beam within the cavity;
a second crystal positioned with respect to the chromium-doped synthetic beryl crystal such that the frequency of the high-power circulating beam is doubled;

a first coating applied to the chromium-doped synthetic beryl crystal;

a second coating applied to the second crystal, the first coating and the second coating being operative to cause at least a portion of the beam to be emitted as ultraviolet light within a wavelength range of between approximately 337.5 nm and 450 nm; and a q-switching element operative to generate pulses of the emitted beam positioned between the first coating and the chromium-doped synthetic beryl crystal; and wherein the chromium-doped synthetic beryl crystal is a chromium-doped hydro-thermally grown synthetic beryl crystal oriented such that polarized emission from the laser diode is parallel to its c-axis; and wherein the first coating comprises high-reflection layers for light in the approximate wavelength ranges of 729 nm to 809 nm and from 364 nm to 405 nm and an antireflection layer at which allows passage of light at an approximate wavelength of 650 nm; and wherein the second crystal is bonded to the chromium-doped hydro-thermally grown synthetic beryl crystal and has an emitting face which is coated with the second coating, the second coating comprising alternating layers of $SiO_2$ and $MgF_2$ to produce a high-reflection of light in the approximate wavelength range of 720 nm to 809 nm and an antireflection coating to allow passage of light in the approximate wavelength range of 364 nm to 405 nm; and whereby the first coating, the q-switching element, the chromium-doped hydro-thermally grown synthetic beryl crystal, the second crystal and the second coating form a compact integral unit which emits light in the approximate wavelength range of 364 nm to 405 nm; and wherein the laser system is manually tuned to emit UV light having a wavelength of approximately 375 nm by depositing antireflection coatings for a wavelength of approximately 375 nm on the second coating.

11. A laser system comprising:

a laser diode array that generates light;

a chromium-doped synthetic beryl crystal having a cavity;

an optical element operative to focus the generated light such that the light beam from the laser diode array is directly inputted into the cavity of the chromium-doped synthetic beryl crystal and such that the light generates a high-power circulating beam within the cavity;

a second crystal positioned with respect to the chromium-doped synthetic beryl crystal such that the frequency of the high-power circulating beam is doubled;

a first coating applied to the chromium-doped synthetic beryl crystal; the first reflective coating comprising layers producing a high-reflection of light in the approximate wavelength ranges from 729 nm to 809 nm and from 364 nm to 405 nm and the passage of light due to an antireflection layer for light having a wavelength of approximately 650 nm;

a second coating applied to the second crystal, the first coating and the second coating being operative to cause at least a portion of the beam to be emitted as ultraviolet light within a wavelength range of between approximately 337.5 nm and 450 nm wherein the second reflective coating comprises alternating layers of $SiO_2$ and $MgF_2$ layers to produce a high-reflection of light in the approximate wavelength range from 720 nm to 809 nm and an antireflection layer in the approximate wavelength range from 364 nm to 405 nm so as to provide a high reflection of light from approximately 729 nm to 809 nm, while allowing light within the approximate range of 364 nm to 405 nm to pass; the light passing through a lens assembly having a diverging concave lens and a collimating convex lens, the lens assembly being operative to shape the beam; and wherein the synthetic beryl crystal is bonded to the frequency doubling crystal to form an integral compact laser unit;

further comprising a hermetically sealed housing and a temperature sensor thermally insulated from the hermetically sealed housing and operative to sense a temperature of the laser diode and the hermetically sealed housing, the laser diode, the chromium-doped synthetic beryl crystal, the optical element and the second crystal being located within the hermetically sealed housing; whereby the system may be used for the detection of pathogens.

12. The system of claim 11, further comprising a high pass optical filter operative to absorb any residual light from the laser diode and absorb light in the wavelength range of 675 to 900 nm from the fundamental emissions of the chromium-doped hydro-thermally grown synthetic beryl crystal and further comprising a hermetically sealed chamber, whereby the system is used for pathogen detection.

13. The system of claim 12, further comprising a lens assembly having a diverging concave lens and a collimating convex lens, the lens assembly being operative to shape the beam.

* * * * *